Oct. 9, 1928.  1,686,695
H. C. HEON
UNIVERSAL JOINT
Filed May 18, 1925
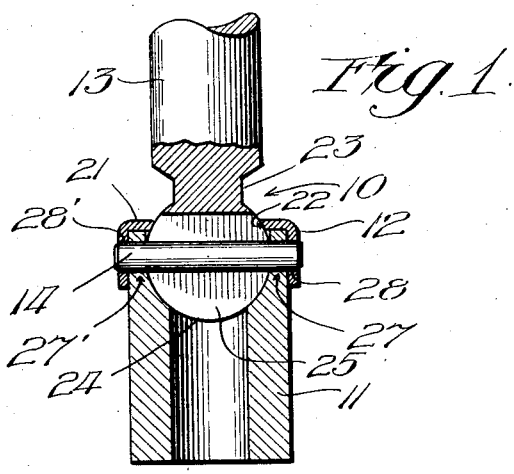
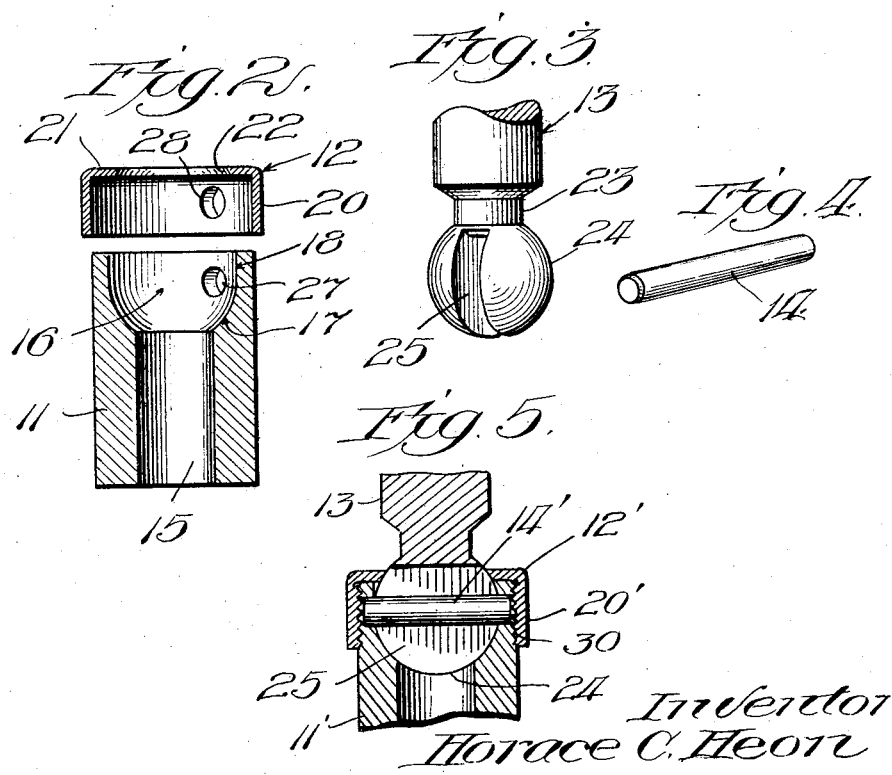
Inventor:
Horace C. Heon Patented Oct. 9, 1928.

1,686,695

UNITED STATES PATENT OFFICE.

HORACE C. HEON, OF CHICAGO, ILLINOIS, ASSIGNOR TO AUTOMOTIVE MAINTENANCE MACHINERY CO., OF CHICAGO, ILLINOIS, A CORPORATION OF ILLINOIS.

UNIVERSAL JOINT.

Application filed May 18, 1925. Serial No. 30,942.

My invention relates to universal joints and has for its object to provide a simple, inexpensive and efficient universal-joint structure made of minimum number of parts and each of simple form susceptible of economic manufacture.

To these ends, and with other objects in view which will become apparent from the following description taken in conjunction with the accompanying drawings, my invention consists in the features of construction, combination and arrangement of parts hereinafter set forth and claimed.

In the drawings, Figure 1 is a central vertical section through a universal joint embodying my invention; Fig. 2 is a vertical section through the two elements of a socket-structure, showing such elements in separated relation; Fig. 3 is a perspective detail of the ball-element; and Fig. 4 a perspective of the connection pin element; while Fig. 5 is a view similar to Fig. 1 showing a modified embodiment of my invention.

The joint-structure 10 is made up of four parts consisting of the socket body 11, socket-cap 12, ball-element 13 having a slotted, spherical head and cross-pin 14 connecting the socket-portion and the ball-member against relative rotation.

The two-part socket has its body member 11 of generally cylindrical form having, if desired, an axial bore 15 opening at its top into the socket-recess 16 which is formed at the upper end of the body member and provides a parti-spherical bearing-wall 17 merging, as shown in Fig. 2, into a tangential or cylindrical wall 18 which extends above the horizontal diametrical plane of juncture between the spherical wall and the cylindrical wall to an extent approximately half the radius upon which the parti-cylindrical wall is formed. The cap member 12 of the socket structure is of inverted cup-shape having a cylindrical side wall 20, neatly fitting around the top portion of the body member 11, and of depth to extend below the horizontal diametrical plane through the spherical portion of the socket, the top-wall 21 of the cap having formed therein a central opening 22 the edge of which is preferably shaped to continue the spherical curvature of the socket-wall 17 when the cap is in working position. The cap may be of relatively thin, light metal, as shown.

The ball-member 13 of the joint has a reduced throat portion 23 beyond which is the integral spherical head 24 having therein a transverse smooth-sided slot 25 cut in a vertical and axial diametrical plane and extending from the end of the head almost to neck 23 or to a depth substantially greater than the radius of the spherical head.

The cross-pin 14, of diameter neatly fitting in said slot 25, extends through said slot at the median horizontal plane of the spherical recess of the socket and receives bearings, adjacent its ends, in the two apertures 27, 27' in the wall of the socket body 11, with which apertures it makes preferably a close fit. In the construction shown in Fig. 1 the pin also extends through, and makes close fit with, apertures 28 and 28' in the cap member 12, thereby maintaining assembly between the cap member 12 and the body member 11 and preventing relative rotation between these parts.

In the form of construction shown in Fig. 5 the socket cap 12' has its side wall 20' internally screw-threaded as at 30 to engage similar threads on the exterior of body member 11' of the socket, and the cross-pin 14' may be made short, if desired, so as to engage only the body member 11', the peripheral wall of the cap member retaining it against endwise displacement.

It will be observed that the cross-pin 14 receives very solid bearing in the uninterrupted walls of the body member 11, and the cylindrical portion 18 of the socket-surface, extending up to a juncture with the top-wall 21 of the cap member, affords a space which advantageously will hold some supply of lubricant for the directly contacting surface portions of the ball-head and spherical socket.

I claim:

In a universal joint, a socket member comprising a body portion having a ball-receiving recess in its bottom providing a spherical surface at the transverse diametrical plane and a cylindrical surface continuing beyond said plane; a ball member having a spherical head portion adapted to snugly engage said recess for movement therein, said head being slotted diametrically from its end to a point substantially beyond the transverse diametrical plane of the sphere; a cap fitting over said body and having an opening in its end wall, the edge of which is shaped to continue the curvature of the walls of said spherical recess; and a diametrical cross pin passing through the slot in said head and engaging the walls of both said body and cap to operatively interlock said foregoing parts.

HORACE C. HEON.